(12) United States Patent
Chen et al.

(10) Patent No.: US 9,483,994 B2
(45) Date of Patent: Nov. 1, 2016

(54) LIQUID CRYSTAL DISPLAY AND GATE DISCHARGE CONTROL CIRCUIT THEREOF

(71) Applicant: AU Optronics Corp., Hsin-Chu (TW)

(72) Inventors: Po-Kun Chen, Hsin-Chu (TW); Gia-Sheng Chu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 14 days.

(21) Appl. No.: 14/614,418

(22) Filed: Feb. 5, 2015

(65) Prior Publication Data
US 2015/0331269 A1    Nov. 19, 2015

(30) Foreign Application Priority Data
May 14, 2014    (TW) .............................. 103117021 A

(51) Int. Cl.
| | | |
|---|---|---|
| G09G 3/36 | (2006.01) | |
| G02F 1/133 | (2006.01) | |
| G02F 1/1362 | (2006.01) | |
| G02F 1/1368 | (2006.01) | |

(52) U.S. Cl.
CPC ........... *G09G 3/3677* (2013.01); *G02F 1/1368* (2013.01); *G02F 1/13306* (2013.01); *G02F 1/136286* (2013.01); *G09G 2310/0289* (2013.01); *G09G 2330/026* (2013.01); *G09G 2330/027* (2013.01)

(58) Field of Classification Search
CPC ............... G09G 3/36; G09G 3/3611; G09G 3/3648–3/3659; G09G 3/3674–3/3681; G09G 2310/0281; G09G 2310/0286–2310/0294; G09G 2330/026; G09G 2330/027; G02F 1/13306; G02F 1/136286; G02F 1/1368; G02F 2001/13629; G02F 2001/136295; G02F 2001/13685
See application file for complete search history.

(56) References Cited

U.S. PATENT DOCUMENTS

| | | | |
|---|---|---|---|
| 7,852,305 B2 | 12/2010 | Tsai | |
| 8,411,012 B2 | 4/2013 | Liao | |
| 8,669,974 B2 | 3/2014 | Yang | |
| 2007/0297559 A1* | 12/2007 | Cho | ...................... G09G 3/3677 377/64 |
| 2010/0097365 A1* | 4/2010 | Fang | .................... G09G 3/3648 345/212 |
| 2010/0177081 A1* | 7/2010 | Lee | ...................... G09G 3/3648 345/211 |

FOREIGN PATENT DOCUMENTS

| | | |
|---|---|---|
| CN | 103065599 A | 4/2013 |
| TW | I370436 | 8/2012 |

* cited by examiner

*Primary Examiner* — Nathan Danielsen
(74) *Attorney, Agent, or Firm* — McClure, Qualey & Rodack, LLP

(57) ABSTRACT

A liquid crystal display (LCD) and a gate discharge control circuit thereof are provided. The gate discharge control circuit has a first voltage division circuit, a control circuit, a second voltage division circuit and at least a discharge switch. A switch of the control circuit operates according to a first DC voltage so as to be turned on when the LCD is powered on and to be turned off during shutting down the LCD. The first voltage division circuit divides a second DC voltage to output a divided voltage. A falling speed of the second DC voltage is less than that of the first DC voltage. During shutting down the LCD, voltage levels of a first end and a control end of the discharge switch are pulled up because of operations of the first and second voltage division circuits, such that discharge operations of pixels of the LCD are performed.

15 Claims, 8 Drawing Sheets

LIQUID CRYSTAL DISPLAY AND GATE DISCHARGE CONTROL CIRCUIT THEREOF

CROSS-REFERENCE TO RELATED APPLICATIONS

Claim of Priority

This application claims priority to Taiwan Patent Application No. 103117021, filed May 14, 2014 and now Taiwan Patent No. 1530934, the contents of both Taiwan Patent Application No. 103117021 and Taiwan Patent No. 1530934 are incorporated herein by reference in their entirety.

BACKGROUND OF THE INVENTION

1. Field of the Invention

The present invention is related to a liquid crystal display (LCD) and a gate discharge control circuit thereof, and more particularly to a liquid crystal display (LCD) and a gate discharge control circuit thereof that are capable of discharging residual charge of pixels during shutting down the LCD to avoid flickering when turning on the LCD.

2. Description of the Prior Art

In general, the LCD uses driving circuits to generate gray-level signals of the pixels of the display panel of the LCD, and the driving circuits comprise a gate driving circuit and a source driving circuit. The gate driving circuit is coupled to a plurality of gate lines (i.e. scan lines) to output gate pulse signals to the pixels, and the source driving circuit is coupled to a plurality of data lines (i.e. source lines) to transmit data signals to the pixels. An intersection of each gate line and each data line is coupled to two ends of an active component (e.g. agate and a source of a thin-film transistor) of a corresponding pixel.

Nowadays, a low temperature poly-silicon (LTPS) LCD of the prior art has a plurality of serially-connected stages of shift registers that are removed from the gate driving chip of the LCD and formed on a glass substrate, so as to form a gate driver on array (GOA) of the LCD. When the shift registers of the gate driving circuit sequentially output the gate pulse signals to sequentially turn on the thin-film transistors coupled to the scan lines, the source driving circuit outputs the corresponding data signals simultaneously to charge the pixel capacitors (including a storage capacitor and a liquid crystal capacitor) of the pixels coupled to the data lines to the desired voltage levels, such that the pixels may display corresponding gray-levels. Due to the operations of charging the pixels, charge may be accumulated in the pixel capacitors of the prior art LCD after a long operating time, such that the pixel capacitors may maintain at an undesired voltage level. In such condition, if the LCD is turned off suddenly, an instant image displayed on the LCD may remain parts of a previous image. Accordingly, the operations of discharges the residual charge of pixels of the LCD of the prior art merely depend on the leakage currents of the thin-film transistors of the pixels, such that the blur of the LCD may represent longer while shutting down the LCD.

To avoid the blur of the LCD, the voltage level of each gate line shall be pulled up immediately while shutting down the LCD, such that the charge accumulated in the pixel capacitors may be released speedily. In the prior art, a power IC is used to provide an XON signal while the LCD is shut down so as to pull up the voltage level of each gate line immediately while shutting down the LCD, such that the charge of the pixel capacitors of the pixels may be released. However, if the cycle of turning on/off the LCD is repeated several times in a short time, residual charge of the pixel capacitors may be accumulated, such that flickering of the display panel of the LCD may be not avoided.

SUMMARY OF THE INVENTION

An embodiment of the present invention provides a gate discharge control circuit of a liquid crystal display (LCD). The gate discharge control circuit comprises a first input end, a second input end, a first voltage division circuit, a control circuit, a second voltage division circuit and at least a discharge switch. The first input end is configured to receive a first direct current (DC) voltage. The second input end is configured to receive a second DC voltage. A falling speed of the second DC voltage is less than a falling speed of the first DC voltage during shutting down the LCD. The first voltage division circuit is coupled between the second input end and a grounded end. The control circuit has a switch. A control end of the switch is coupled to the first input end, a first end of the switch is coupled to a first node of the first voltage division circuit, and a second end of the switch is coupled to the grounded end. A first end of the second voltage division circuit is coupled to the first node and the first end of the switch. A first end of the at least a discharge switch is coupled to the second node, a second end of the at least a discharge switch is coupled to at least a gate line of the LCD, and the control end of the at least a discharge switch is coupled to the second end of the second voltage division circuit.

An embodiment of the present invention provides a gate discharge control circuit of an LCD. The gate discharge control circuit comprises a first input end, a second input end, a first voltage division circuit, a control circuit, a second voltage division circuit and at least a discharge switch. The first input end is configured to receive a first direct current (DC) voltage. The second input end is configured to receive a second DC voltage. A raising speed of the second DC voltage is greater than a raising speed of the first DC voltage during turning on the LCD. The first voltage division circuit is coupled between the second input end and a grounded end. The control circuit has a switch. A control end of the switch is coupled to the first input end, a first end of the switch is coupled to a first node of the first voltage division circuit, and a second end of the switch is coupled to the grounded end. A first end of the second voltage division circuit is coupled to the first node and the first end of the switch. A first end of the at least a discharge switch is coupled to the second node, a second end of the at least a discharge switch is coupled to at least a gate line of the LCD, and the control end of the at least a discharge switch is coupled to the second end of the second voltage division circuit.

Another embodiment of the present invention provides a gate discharge control circuit of an LCD. The gate discharge control circuit comprises a first input end, a second input end and at least a discharge switch. The first input end is configured to receive a start pulse signal of the LCD. The second input end is configured to receive a clock signal of the LCD. The least a discharge switch has a first end, a second end and a control end. The first end is coupled to the second input end, the second end is coupled to at least a gate line of the LCD, and the control end is coupled to the first input end. A pulse of the start pulse signal and a pulse of the clock signal are overlapped partially in a timeline.

An embodiment of the present invention provides a liquid crystal display (LCD). The LCD comprises a display plane, a gate driver and the fore said gate discharge control circuit.

The display plane comprises a plurality of data lines, a plurality of gate lines and a plurality of pixels. Each of the pixels has a pixel switch and a pixel capacitor. A control end of the pixel switch is coupled to one of the gate lines, a first end of the pixel switch is coupled to one of the data lines, a second end of the pixel switch is coupled to a first end of the pixel capacitor, and a second end of the pixel capacitor is coupled to a grounded end. The gate driver is coupled to the control end of the pixel switch of each of the pixels via the gate lines. The second end of the at least a discharge switch of the gate discharge control circuit is coupled to at least one of the gate lines.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
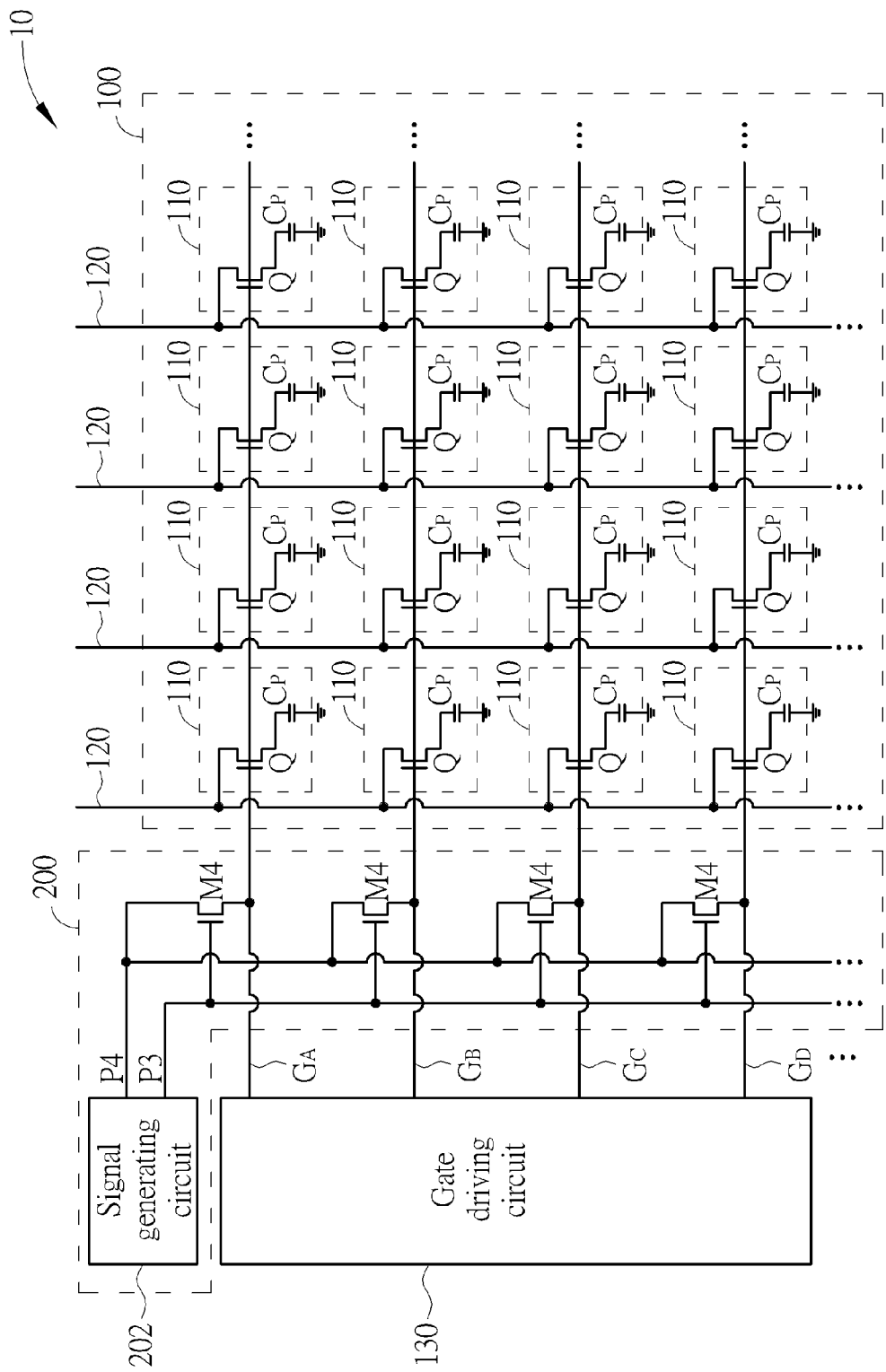
FIG. 1 is a schematic diagram of a liquid crystal display (LCD) having a gate discharge control circuit according to an embodiment of the present invention.
Figure 2:
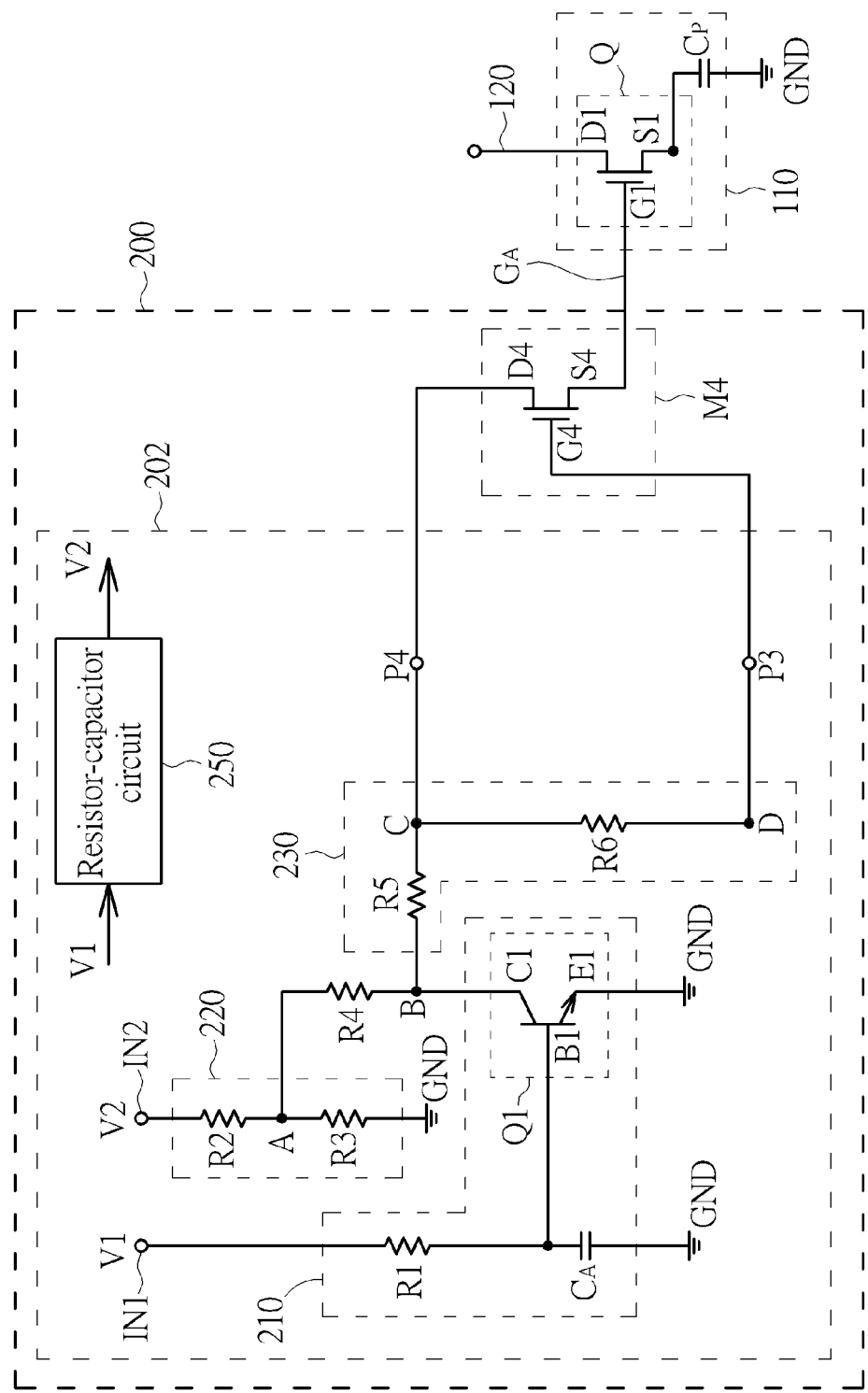
FIG. 2 is a circuit diagram of the gate discharge control circuit and the pixel in FIG. 1.

Please refer to FIGS. 1 and 2. FIG. 1 is a schematic diagram of a liquid crystal display (LCD) 10 having a gate discharge control circuit 200 according to an embodiment of the present invention. FIG. 2 is a circuit diagram of the gate discharge control circuit 200 and the pixel 110 in FIG. 1. The LCD 10 comprises a display panel 100, a gate driving circuit 130 and the gate discharge control circuit 200. The display panel 100 comprises a plurality of data lines 120, a plurality of gate lines (e.g. $G_A$ to $G_D$) and a plurality of pixels 110. The gate driving circuit 130 is coupled to the gate lines and configured to output gate pulse signals (i.e. scan signals) to the pixels 110. The LCD 10 may further comprises a source driving circuit, and the source driving circuit is coupled to the data lines 120 and configured to output data signals to the pixels 110. Each of the pixels 110 comprises a pixel switch Q and a pixel capacitor Cp. A control end G1 of the pixel switch Q is coupled to one of the gate lines, a first end D1 of the pixel switch Q is coupled to one of the data lines 120, a second end S1 of the pixel switch Q is coupled to a first end of the pixel capacitor Cp, and a second end of the pixel capacitor Cp is coupled to a grounded end GND. The pixel switch Q may be a thin film transistor (TFT), and the first end D1, the second end S1 and the control end G1 are respectively the drain, the source and the gate of the TFT. The gate driving circuit 130 is coupled to the control ends G1 of the pixel switches Q of the pixels 110 via the gate lines so as to control the operations of the pixel switches 4.

The gate discharge control circuit 200 comprises a first input end IN1, a second input end IN2, a signal generating circuit 202 and at least a discharge switch M4. The signal generating circuit 202 comprises a control circuit 210, a first voltage division circuit 220 and a second voltage division circuit 230, and the signal generating circuit 202 is coupled to the discharge switch M4 through the terminals P3 and P4. The first input end IN1 is configured to receive to receive a first direct current (DC) voltage V1, and the second input end IN2 is configured to receive a second DC voltage V2. The control circuit 210 has a switch Q1. A control end B1 of the switch Q1 is coupled to the first input end IN1, a first end C1 of the switch Q1 is coupled to a first node A in the first voltage division circuit 220, and a second end E1 of the switch Q1 is coupled to the grounded end GND. In the embodiment, the switch Q1 is an NPN Bipolar Junction Transistor (BJT), and the first end C1, the second E1 and the control end B1 are the collector, the emitter and the base of the NPN BJT respectively. However, the present invention is not limited thereto. For example, the switch Q1 may be an N-type metal-semiconductor-oxide transistor (NMOS), and the first end C1, the second end E1 and the control end B1 are the drain, the source and the gate of the NMOS respectively. Moreover, the first voltage division circuit 220 is coupled between the second input end IN2 and the grounded end GND and configured to output a divided voltage from the first node A. The second voltage division circuit 230 has a first end B, a second end D and a second node C, and the second voltage division circuit 230 is configured to output divided voltages from the second node C and the second end D to the terminals P4 and P3. The first end B of the second voltage division circuit 230 is coupled to the first node A and the first end C1 of the switch Q1.

Moreover, it should be noted that the number of the discharge switches M4 of the gate discharge control circuit 200 and the connections between the discharge switches M4 and the gate lines may be adjusted according to different demands. Take the embodiment in FIG. 1 for example, the gate discharge control circuit 200 comprises a plurality of discharge switches M4, and each of the discharge switches M4 is coupled to a corresponding gate line (e.g. $G_A$) and configured to control the operations of the pixel switches Q of the pixels 110 coupled to the corresponding gate line. Moreover, in another embodiment of the present invention, the gate discharge control circuit 200 may comprise a single discharge switch M4 coupled to all of the gate lines of the LCD 100 to control the operations of all of the pixel switches Q of the pixels 110. Further, in an embodiment of the present invention, the gate discharge control circuit 200 may comprises a plurality of discharge switches M4, and each of the discharge switches M4 is coupled to a plurality of corresponding gate lines and configured to control the operations of the pixel switches Q of the pixels 110 coupled to the corresponding gate lines. For the sake of better understanding the present invention, FIG. 2 merely illustrates one of the discharge switches M4 of the gate discharge control circuit 200, and the discharge switch M4 is coupled to the gate line $G_A$. The discharge switch M4 has a first end D4, a second end S4 and a control end G4. The first end D4 of the discharge switch M4 is coupled to the second node C, the second end S4 of the discharge switch M4 is coupled to at least a gate line (e.g. the gate line $G_A$) of the LCD 10, and the control end G4 of the discharge switch M4 is coupled to the second end D of the second voltage division circuit 230. The discharge switch M4 may be an N-type metal-semiconductor-oxide transistor (NMOS), and the first end D4, the second end S4 and the control end G4 may be the drain, the source and the gate of the NMOS respectively, but the present invention is not limited thereto.

Figure 3:
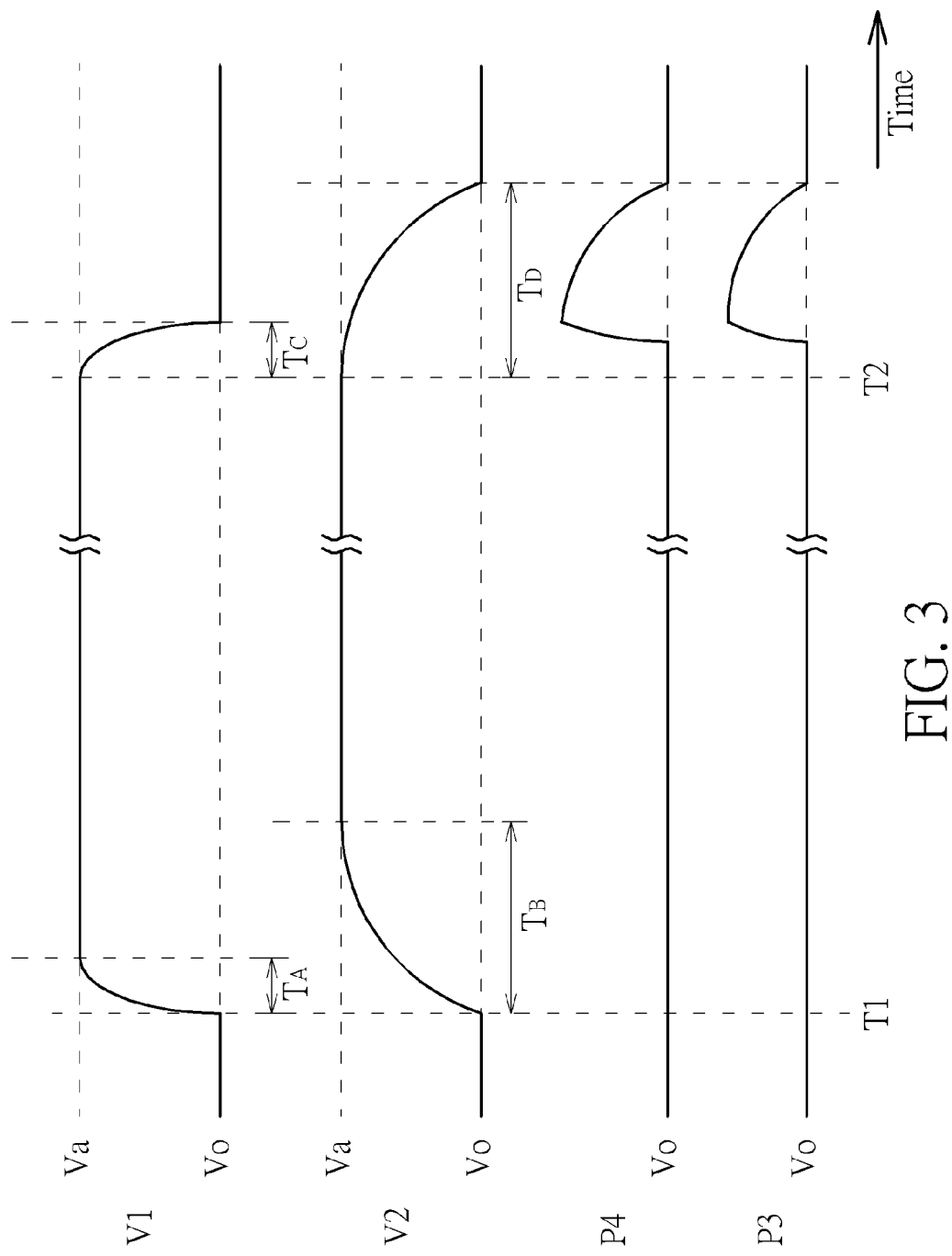
FIG. 3 is a timing diagram of the gate discharge control circuit in FIG. 2.

Please refer to FIG. 3 and FIG. 2. FIG. 3 is a timing diagram of the gate discharge control circuit 200 in FIG. 2. A time point T1 is the time point when turning on, and a time point T2 is the time point when shutting down the LCD 10. When the LCD 10 is turned on, the first DC voltage V1 and the second DC voltage V2 are pulled up from a second voltage level Vo to a first voltage level Va. In general, the second voltage level Vo is equal to zero volts (i.e. a grounded voltage level), and the first voltage level Va is greater than the second voltage level. As shown in FIG. 3, the time duration $T_A$ during which the first DC voltage V1 is pulled up from the second voltage level Vo to the first voltage level Va is less than the time duration $T_B$ during which the second DC voltage V2 is pulled up from the second voltage level Vo to the first voltage level Va. Therefore, when turning on the LCD 10, a raising speed of the second DC voltage V2 is less than a raising speed of the first DC voltage V1. Moreover, when shutting down the LCD 10, the first DC voltage V1 and the second DC voltage V2 are pulled down from the first voltage level Va to the second voltage level Vo. The time duration $T_C$ during which the first DC voltage V1 is pulled down from the first voltage level Va to the second voltage level Vo is less than the time duration $T_D$ during which the second DC voltage V2 is pulled up from the first voltage level Va to the second voltage level Vo. Therefore, when shutting down the LCD 10, a falling speed of the second DC voltage V2 is less than a falling speed of the first DC voltage V1. In an embodiment of the present invention, the gate discharge control circuit 200 may further comprise a resistor-capacitor circuit 250, which is configured to receive the first DC voltage V1 to output the second DC voltage V2. The resistor-capacitor circuit 250 may be composed of at least a resistor and at least a capacitor. Due to the resistor-capacitor effect of the resistor-capacitor circuit 250, the waveform of the signal output from the resistor-capacitor circuit 250 is the same as the waveform of the second DC voltage V2 shown in FIG. 3. In another embodiment of the present invention, the resistor-capacitor circuit 250 may be integrated with the first voltage division circuit 220. For example, another capacitor may be added to couple between the second input end IN2 and the grounded end GND.

During shutting down the LCD 10, since the voltage level of the first DC voltage V1 is pulled down to the second voltage level Vo speedily, the switch Q1 is turned off. When the switch Q1 is turned off, since the voltage level of the second DC voltage V2 is not pulled down to the second voltage level Vo yet, the voltage levels of the terminals P3 and P4 is pulled up from the second voltage level Vo. When the voltage levels of the terminals P3 and P4 is pulled up, the discharge switch M4 is turned on, such that the voltage level of the gate line $G_A$ is pulled up so as to turn on the pixel switch Q. When the pixel switch Q is turned on, the charge accumulated in the pixel capacitor Cp is released through the pixel switch Q and the data line 120, and the operations of discharging the pixels 110 of the display panel 100 is completed accordingly. Afterward, since the voltage level of the second DC voltage V2 is pulled down to the second voltage Vo gradually, the voltage levels of the terminals P3 and P4 are pulled down to the second voltage Vo, and the discharge switch M4 is turned off.

Additionally, when the LCD 10 operates in a normal state, since the voltage levels of the first DC voltage V1 and the second DC voltage V2 are the first voltage level Va, the switch Q1 is turned on, and the first end B of the second voltage division circuit 230 is coupled to the grounded end GND. In this condition, the second node C and the first end D of the second voltage division circuit 230 are coupled to the grounded end GND and at a low voltage level, and the discharge switch M4 is turned off since the first end D4 and the control end G4 thereof are at a low voltage level. Therefore, when the LCD 10 operates in a normal state, the gate discharge control circuit 200 does not pull up the voltage level of any gate line of the LCD 10, such that it can be ensured that the display panel 100 displays images normally.

In an embodiment of the present invention, the control circuit 210 may further comprise a resistor R1 and a capacitor $C_A$. The resistor R1 is coupled between the first input end IN1 and the control end B1 of the switch Q1 for limiting a current flowing through the control end B1 and the second end E1 of the switch Q1, such that the switch Q1 is protected from an excessive current flowing through it. The capacitor $C_A$ is coupled between the control end B1 of the switch Q1 and the grounded end GND for filtering out the noise in the first DC voltage V1 when turning on/off the LCD 10. In an embodiment of the present invention, the first voltage division circuit 220 may comprise resistors R2 and R3. The resistor R2 is coupled between the second input end IN2 and the first node A, and the resistor R3 is coupled between the first node A and the grounded end GND. In another embodiment of the present invention, the gate discharge control circuit 200 may further comprise a resistor R4. The resistor R4 is coupled between the first node A and the first end B of the second voltage division circuit 230 for limiting a current flowing through the first end C1 and the second end E1 of the switch Q1, such that the switch Q1 is protected from an excessive current flowing through it. In another embodiment of the present invention, the second voltage division circuit 230 may comprise resistors R5 and R6. The resistor R5 is coupled between the first end B and the second node C of the second voltage division circuit 230, and the resistor R6 is coupled between the second node C and the second end D of the second voltage division circuit 230.

Figure 4:
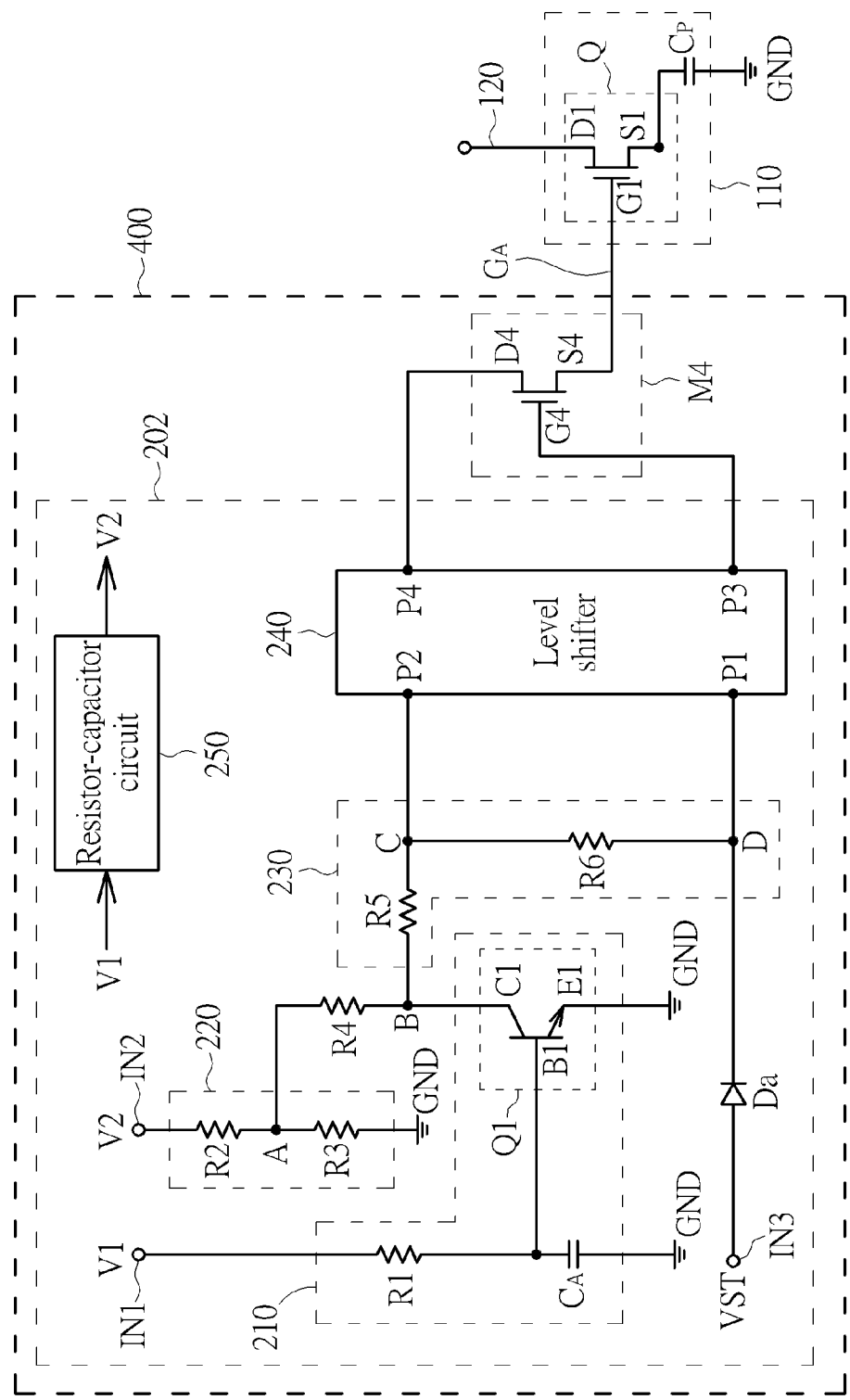
FIG. 4 is a circuit diagram of a gate discharge control circuit and a pixel according to another embodiment of the present invention.

Please refer to FIG. 4. FIG. 4 is a circuit diagram of a gate discharge control circuit 400 and a pixel 110 according to another embodiment of the present invention. The difference between the gate discharge control circuit 400 and the gate discharge control circuit 200 in FIG. 2 is that the gate discharge control circuit 400 further comprises a level shifter 240. The level shifter 240 is coupled between the second voltage division circuit 230 and the discharge switch M4 and comprises terminals P1 to P4. The terminal P1 is coupled to the second end D of the second voltage division circuit 230, the terminal P2 is coupled to the second node C, the terminal P3 is coupled to the control end G4 of the discharge switch M4, and the terminal P4 is coupled to the first end D4 of the discharge switch M4. The level shifter 240 is configured to determine a voltage level of the first end D4 of the discharge switch M4 via the terminal P4 according to the voltage level of the second node C and is configured to determine a voltage level of the control end G4 of the discharge switch M4 via the terminal P3 according to the voltage level of the second end D of the second voltage division circuit 230. In more detail, when the voltage level of the second node C (i.e. the voltage level of the terminal P2) is greater than or equal to the minimum voltage level (referred to VIH) that is interpreted as a '1' by the level shifter 240, the voltage level of the terminal P4 is equal to a gate high voltage (referred to VGH). When the voltage level of the second node C is less than or equal to the maximum voltage level (referred to VIL) that is interpreted as a '0' by the level shifter 240, the voltage level of the terminal P4 is equal to a gate low voltage (referred to VGL). When the voltage level of the second end D (i.e. the voltage level of the terminal P1) of the second voltage division circuit 230 is greater than or equal to the minimum voltage level VIH that is interpreted as a '1' by the level shifter 240, the voltage level of the terminal P3 is equal to the gate high voltage VGH. When the voltage level of the second end D is less than or equal to the maximum voltage level VIL that is interpreted as a '0' by the level shifter 240, the voltage level of the terminal P3 is equal to the gate low voltage VGL.

Figure 5:
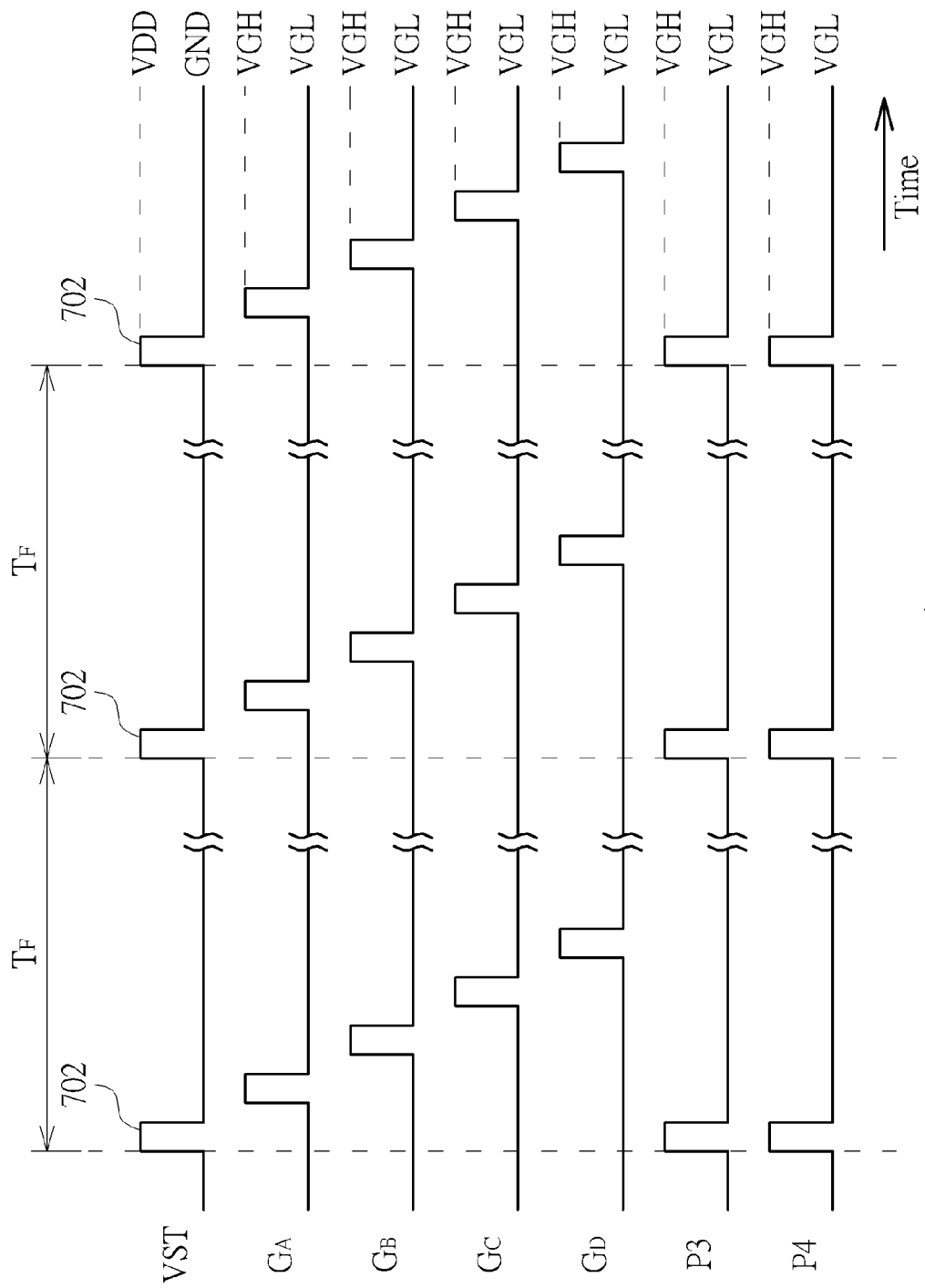
FIG. 5 is a timing diagram of the gate discharge control circuit in FIG. 4.

Additionally, in another embodiment of the present invention, the gate discharge control circuit 400 may further comprise a third input end IN3 and a diode Da. The third input end IN3 is configured to receive a start pulse signal VST of the LCD 10. An anode of the diode Da is coupled to the third input end IN3, and a cathode of the diode Da is coupled to the second end D of the second voltage division circuit 230. Please refer to FIG. 5 with reference of FIGS. 1 and 4. FIG. 5 is a timing diagram of the gate discharge control circuit 400 in FIG. 4. The LCD 10 generates a pulse 702 of the pulse signal VST within each frame period $T_F$ of the LCD 10, and a voltage level of the pulse 702 is equal to the system high voltage VDD. Within each frame period $T_F$, after the pulse 702 of the pulse signal VST is generated, the gate driving circuit 130 sequentially outputs the gate pulse signals to the gate lines (e.g. $G_A$ to $G_D$) to sequentially turn on each row of the pixel switches Q of the display panel 100. When the start pulse signal VST is at the gate high voltage VGH, the diode is forward-biased and conductive, such that the voltage levels of the second end D and the second node C of the second voltage division circuit 230 are pulled up above the minimum voltage level VIH that is interpreted as a '1' by the level shifter 240. Accordingly, the voltage levels of the terminals P3 and P4 of the level shifter 240 are equal to the gate high voltage VGH, and the discharge switch M4 is turned on. Therefore, due to the pulse 702 of the pulse signal VST, the gate discharge control circuit 400 discharges the pixel capacitor Cp of each of the pixels 110 and then sequentially outputs the gate pulse signals to the pixels 110 within each frame period $T_F$. Since the operations of discharging the pixel capacitor Cp of the pixel 110 are performed within each frame period $T_F$, residual charge may not accumulated in the pixel capacitor Cp excessively, such that the operations of discharging the pixel capacitors while shutting down the LCD 10 may be more effectively.

Figure 6:
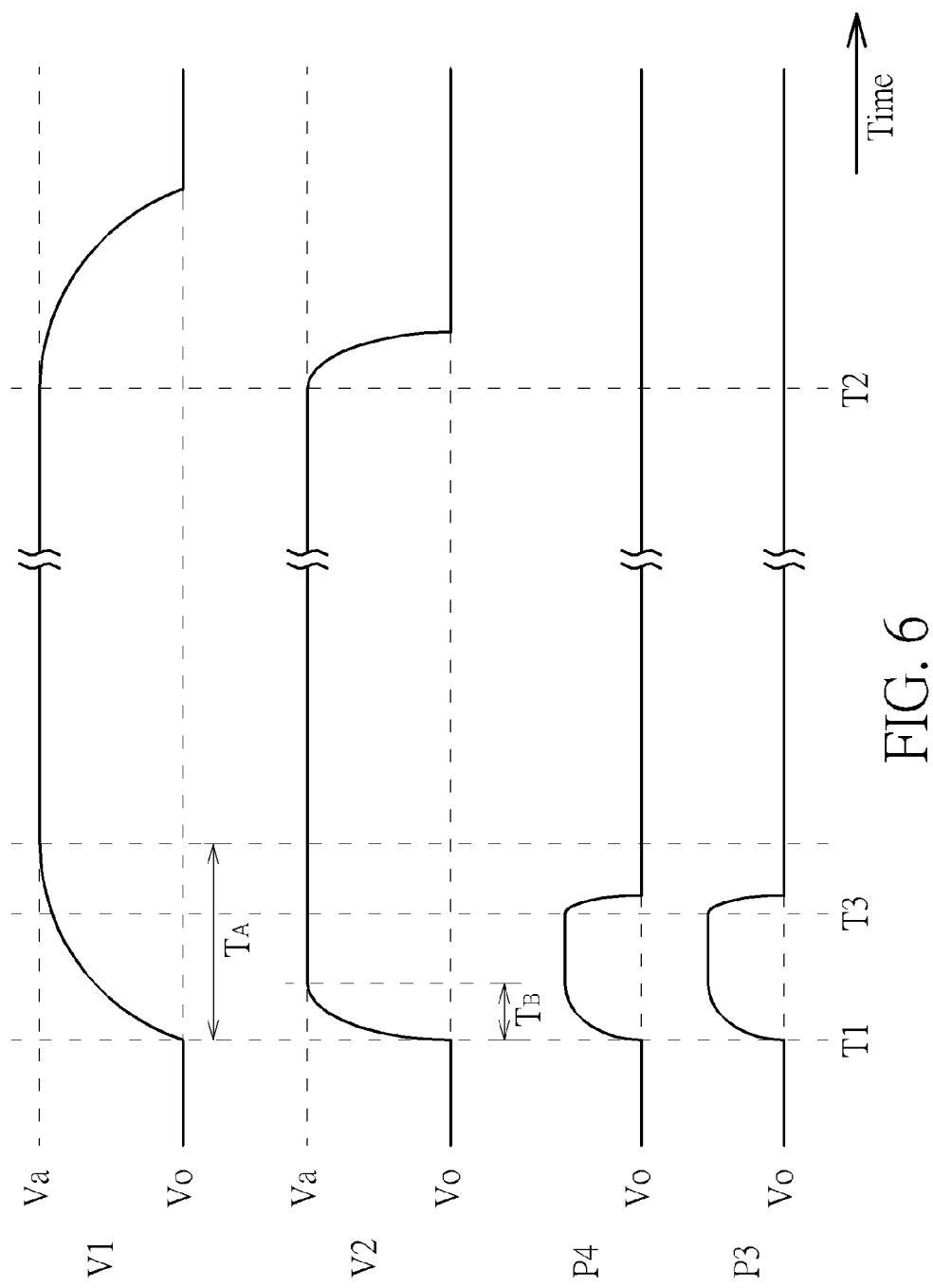
FIG. 6 is another timing diagram of the gate discharge control circuit in FIG. 2.

In the fore said embodiments, when the LCD 10 is turned on, the raising speed of the second DC voltage V2 is less than the raising speed of the first DC voltage V1. However, in some embodiment of the present invention, the raising speed of the second DC voltage V2 may be greater than the raising speed of the first DC voltage V1, such that the operations of discharging the pixels 110 may be performed while turning on the LCD 10. Please refer to FIG. 2 and FIG. 6. FIG. 6 is another timing diagram of the gate discharge control circuit 200 in FIG. 2. In the embodiment, the time duration $T_A$ during which the first DC voltage V1 is pulled up from the second voltage level Vo to the first voltage level Va is greater than the time duration $T_B$ during which the second DC voltage V2 is pulled up from the second voltage level Vo to the first voltage level Va. Therefore, when turning on the LCD 10, the raising speed of the second DC voltage V2 is greater than the raising speed of the first DC voltage V1. Accordingly, before the switch Q1 is turned on, the voltage levels of the terminals P3 and P4 are pulled up, and the discharge switch M4 is turned on. When the discharge switch M4 is turned on, the operation of discharging the pixel 110 is performed. Afterwards, since the first DC voltage V1 keeps raising, the switch Q1 is turned on at the time point T3, and the operation of discharging the pixel 110 is stopped. Accordingly, during turning on the LCD 10, the pixels 110 are discharged immediately. Additionally, since the waveform of the pulse signal VST and the operations of the diode Da are not influenced by the timing of the first DC voltage V1 and/or the second DC voltage V2, the gate discharge control circuit 200 may use the pulse signal VST and the diode Da to control the pixel 110 to perform the operation of discharging within each frame period $T_F$.

The timing diagram in FIG. 6, which illustrates that the raising speed of the second DC voltage V2 is greater than the raising speed of the first DC voltage V1, may be also adopted in the gate discharge control circuit 400 in FIG. 4. Since the difference between the gate discharge control circuits 200 and 400 is that the gate discharge control circuit 400 further comprises the level shifter 240, and the level shifter 240 determines the voltage levels of the terminals P3 and P4 according to the voltage levels of the terminals P1 and P2, the gate discharge control circuit 400 controls the pixel 110 to perform the operation of discharging during turning on the LCD 10. Moreover, since the waveform of the pulse signal VST and the operations of the diode Da are not influenced by the timing of the first DC voltage V1 and/or the second DC voltage V2, the gate discharge control circuit 200 may use the pulse signal VST and the diode Da to control the pixel 110 to perform the operation of discharging within each frame period $T_F$.

Figure 7:
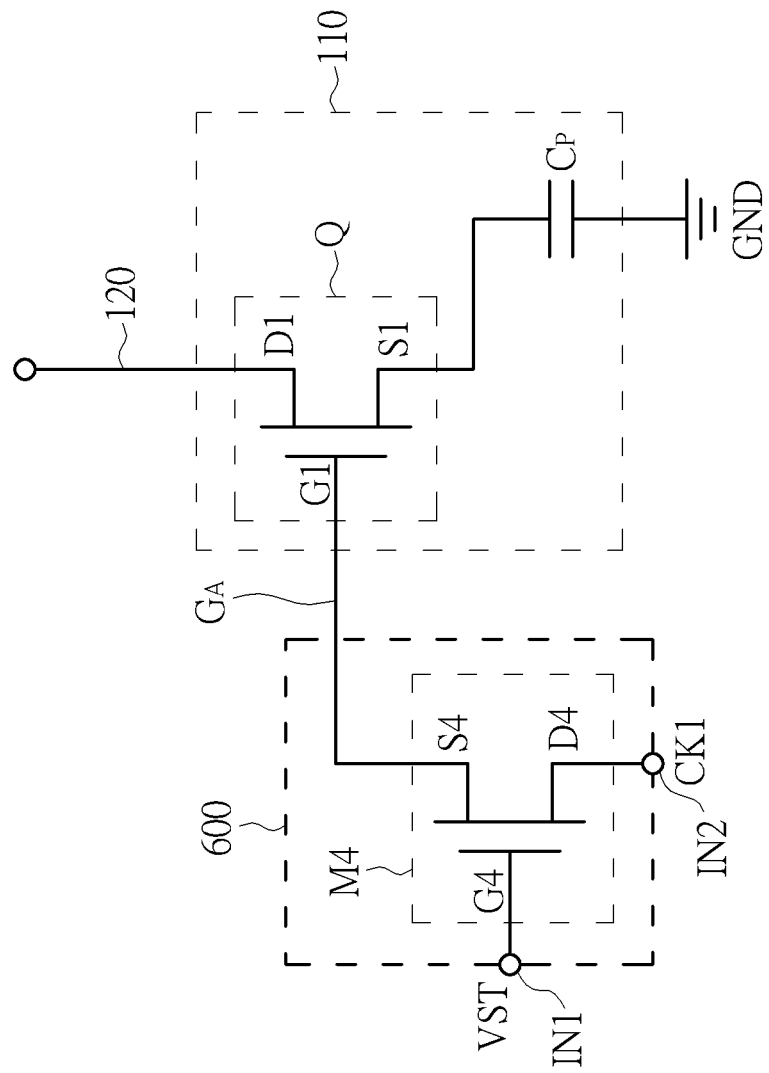
FIG. 7 is a circuit diagram of a gate discharge control circuit and a pixel according to another embodiment of the present invention.
Figure 8:
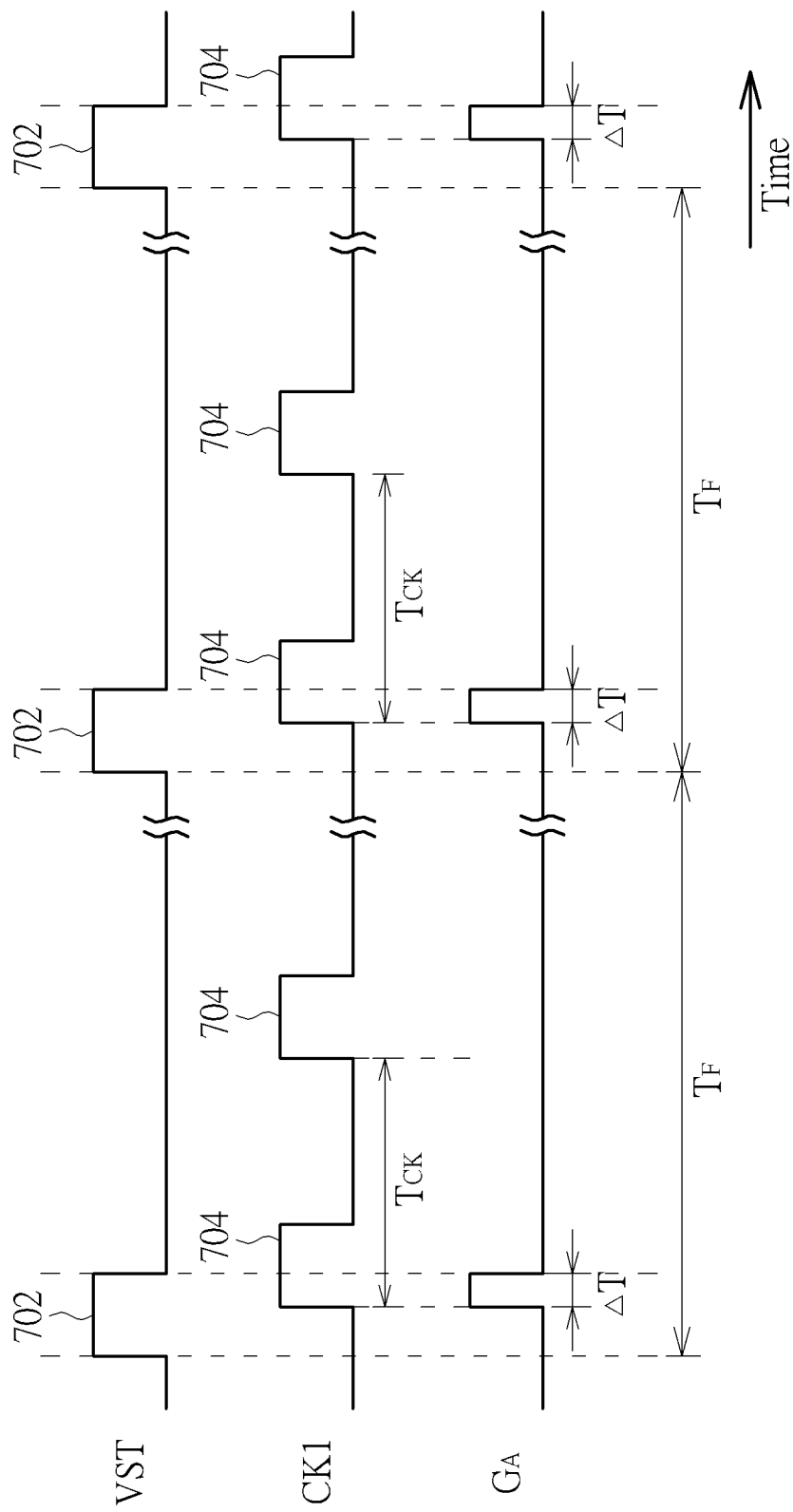
FIG. 8 is a timing diagram of the gate discharge control circuit in FIG. 7.

Please refer to FIGS. 7 and 8. FIG. 7 is a circuit diagram of a gate discharge control circuit 600 and a pixel 110 according to another embodiment of the present invention. FIG. 8 is a timing diagram of the gate discharge control circuit 600 in FIG. 7. The gate discharge control circuit 600 comprises a first input end IN1, a second input end IN2 and at least a discharge switch M4. The first input end IN1 is configured to receive the pulse signal VST of the LCD 10, and the second input end IN2 is configured to receive a clock signal CK1. The first end D4 of the discharge switch M4 is coupled to the second input end IN2, the second end S4 of the discharge switch M4 is coupled to at least a gate line (e.g. the gate line $G_A$), and the control end G4 of the discharge switch M4 is coupled to the first input end IN1. The pulses 702 of the start pulse signal VST and the pulses 704 of the clock signal CK1 are overlapped partially in the timeline. Additionally, the time duration (i.e. the frame period $T_F$) between two adjacent pulses 702 of the start pulse signal VST is greater than the time duration $T_{CK}$ between two adjacent pulses 704 of the clock signal CK1. Therefore, since each pulse 702 of the start pulse signal VST is overlapped partially with a corresponding one of the pulses 704 of the clock signal CK1 within the time duration ΔT, the discharge switch M4 is turned on, and the voltage level of the gate line $G_A$ is pulled up. In this condition, the pixel switch Q is turned on since the gate line $G_A$ is at a high voltage level. Therefore, due to the start pulse signal VST and the clock signal CK1, the gate discharge control circuit 600 discharges the pixel capacitor Cp of each of the pixels 110 and then sequentially outputs the gate pulse signals to the pixels 110 within each frame period $T_F$. Since the operations of discharging the pixel capacitor Cp of the pixel 110 are performed within each frame period $T_F$, residual charge may not accumulated in the pixel capacitor Cp excessively, such that the operations of discharging the pixel capacitors while shutting down the LCD 10 may be more effectively.

According to the liquid crystal display and the gate discharge control circuits of the present invention, the voltage levels of the gate lines may be pulled up speedily while shutting down the LCD, such that the operations of discharging the pixels of the LCD may be performed effectively. Moreover, in an embodiment of the present invention, the gate discharge control circuit may discharge the pixel capacitors of the pixels during switching the frames of the LCD, such that the operations of discharging the pixel capacitors while shutting down the LCD may be more effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gate discharge control circuit of a liquid crystal display (LCD), comprising:
    a first input end, configured to receive a first direct current (DC) voltage;
    a second input end, configured to receive a second DC voltage, wherein a falling speed of the second DC voltage is less than a falling speed of the first DC voltage during shutting down the LCD;
    a first voltage division circuit, coupled between the second input end and a grounded end;
    a control circuit, having a switch, a control end of the switch being coupled to the first input end, a first end of the switch being coupled to a first node of the first voltage division circuit, and a second end of the switch being coupled to the grounded end;
    a second voltage division circuit, having a first end, a second end and a second node, the first end of the second voltage division circuit being coupled to the first node and the first end of the switch; and
    at least a discharge switch, having a first end, a second end and a control end, the first end of the at least a discharge switch being coupled to the second node, the second end of the at least a discharge switch being coupled to at least a gate line of the LCD, and the control end of the at least a discharge switch being coupled to the second end of the second voltage division circuit.

2. The gate discharge control circuit of claim 1, further comprising:
    a third input end, configured to receive a start pulse signal of the LCD; and
    a diode, an anode of the diode being coupled to the third input end, and a cathode of the diode being coupled to the second end of the second voltage division circuit.

3. The gate discharge control circuit of claim 2, wherein the LCD generates a pulse of the pulse signal within each frame period of the LCD.

4. The gate discharge control circuit of claim 1, further comprising:
    level shifter, coupled between the second voltage division circuit and the at least a discharge switch, configured to determine a voltage level of the first end of the at least a discharge switch according to a voltage level of the second node, and configured to determine a voltage level of the control end of the at least a discharge switch according to a voltage level of the second end of the second voltage division circuit.

5. The gate discharge control circuit of claim 1, wherein the control circuit further comprises:
    a first resistor, coupled between the first input end and the control end of the switch; and
    a capacitor, coupled between the control end of the switch and the grounded end.

6. The gate discharge control circuit of claim 1, wherein the first voltage division circuit comprises:
    a second resistor, coupled between the second input end and the first node; and
    a third resistor, coupled between the first node and the grounded end.

7. The gate discharge control circuit of claim 1, further comprising:
    a fourth resistor, coupled between the first node and the first end of the second voltage division circuit.

8. The gate discharge control circuit of claim 1, wherein the second voltage division circuit comprises:
    a fifth resistor, coupled between the first end of the second voltage division circuit and the second node; and
    a sixth resistor, coupled between the second node and the second end of the second voltage division circuit.

9. The gate discharge control circuit of claim 1 further comprising:
    a resistor-capacitor circuit, configured to receive the first DC voltage to output the second DC voltage.

10. The gate discharge control circuit of claim 1, wherein a raising speed of the second DC voltage is less than a raising speed of the first DC voltage during turning on the LCD.

11. A liquid crystal display (LCD), comprising:
    a display plane, comprising:
        a plurality of data lines;
        a plurality of gate lines; and
        a plurality of pixels, each of the pixels having a pixel switch and a pixel capacitor, a control end of the pixel switch being coupled to one of the gate lines, a first end of the pixel switch being coupled to one of the data lines, a second end of the pixel switch being coupled to a first end of the pixel capacitor, and a second end of the pixel capacitor being coupled to a grounded end;
    a gate driver, coupled to the control end of the pixel switch of each of the pixels via the gate lines; and
    the gate discharge control circuit of claim 1, wherein the second end of the at least a discharge switch of the gate discharge control circuit is coupled to at least one of the gate lines.

12. A gate discharge control circuit of a liquid crystal display (LCD), comprising:
    a first input end, configured to receive a first direct current (DC) voltage;
    a second input end, configured to receive a second DC voltage, wherein a raising speed of the second DC voltage is greater than a raising speed of the first DC voltage during turning on the LCD;
    a first voltage division circuit, coupled between the second input end and a grounded end;
    a control circuit, having a switch, a control end of the switch being coupled to the first input end, a first end of the switch being coupled to a first node of the first voltage division circuit, and a second end of the switch being coupled to the grounded end;
    a second voltage division circuit, having a first end, a second end and a second node, the first end of the second voltage division circuit being coupled to the first node and the first end of the switch; and at least a discharge switch, having a first end, a second end and a control end, the first end of the at least a discharge switch being coupled to the second node, the second end of the at least a discharge switch being coupled to at least a gate line of the LCD, and the control end of the at least a discharge switch being coupled to the second end of the second voltage division circuit.

13. A gate discharge control circuit of a liquid crystal display (LCD), comprising:
   a first input end, configured to receive a start pulse signal of the LCD;
   a second input end, configured to receive a clock signal of the LCD;
   a first voltage division circuit, coupled between the second input end and a grounded end;
   a control circuit, having a switch, a control end of the switch being coupled to the first input end, a first end of the switch being coupled to a first node of the first voltage division circuit, and a second end of the switch being coupled to the grounded end;
   a second voltage division circuit, having a first end, a second end and a second node, the first end of the second voltage division circuit being coupled to the first node and the first end of the switch; and
   at least a discharge switch, having a first end, a second end and a control end, the first end being coupled to the second input end, the second end being coupled to at least a gate line of the LCD, and the control end being coupled to the first input end;
   wherein a pulse of the start pulse signal and a pulse of the clock signal are overlapped partially in a timeline.

14. The gate discharge control circuit of claim 13, wherein the LCD generates a pulse of the pulse signal within each frame period of the LCD.

15. The gate discharge control circuit of claim 13, wherein a time interval between two successive pulses of the start pulse signal is greater than a time interval between two successive pulses of the clock signal.

* * * * *